[2,918,452]
[Patented Dec. 22, 1959]

2,918,452

PROCESS FOR THE MANUFACTURE OF METHYLOL MELAMINES AND ALKYLATED METHYLOL MELAMINES

Kenneth A. Kun, Stamford, and Joseph A. Schmidlein, Darien, Conn., assignors to American Cyanamid Company, New York, N.Y., a corporation of Maine No Drawing. Application January 11, 1956
Serial No. 558,411

10 Claims. (Cl. 260—67.6)

The present invention relates to a process for preparing certain methylol melamines, alkylated methylol melamines, the products of said processes, and their use in surface coatings and the like.

Heretofore, in order to obtain methylol melamines, suitable mol ratios of melamine and formaldehyde were combined in an aqueous medium, heated, and the resulting solution of methylol melamine was thereafter dried over long periods of time to obtain a solid product. The reaction was usually carried out at a neutral pH, since extremes in acid and alkali pH's for such reactions favored polymerization and produced other operational difficulties. Such processes, in addition to the difficulty incurred through working with hot formaldehyde solutions, were expensive because of the periods of time involved to dry or dehydrate and the additional equipment required to do the same.

If it was desirable to alkylate the methylol melamine, drying of the said material was necessary since the alkylation is an equilibrium reaction and in the presence of water complete alkylation was difficult if not impossible to achieve. The necessity for dehydration thus prevented what might be termed a "one pot" or continuous type process.

Therefore, it is an object of the present invention to provide a process for producing methylol melamine whereby the said material is obtained in an easily handled solid state, as distinguished from a liquid or syrupy state, and in controlled periods of time.

Another object of the present invention is to provide a process for making alkylated methylol melamine, in which the methylol melamine need not be dehydrated prior to alkylation.

A further object is to provide alkylated condensation products which are compatible with a wide variety of alkyd resins, and which impart improved properties such as gloss, hardness, mar resistance, and chemical resistance to alkyd resin surface coating compositions. It is still a further object to provide such condensation products which may be used in admixture with commercially available amino resins in alkyd resin surface coating compositions to impart improved properties of hardness, gloss, mar resistance, and the like thereto.

These and other objects and advantages will become apparent as the present invention is set forth more fully hereinbelow.

According to the present invention a process is provided for preparing methylol melamine which comprises heating with continuous mixing melamine and paraformaldehyde in a mol ratio of 1:6.5–20 respectively in the presence of about 8% to 20% by weight of water based on the total weight of the reaction mixture while maintaining a pH of at least 8 and not greater than 13.

The temperature to which the reaction mixture, melamine, paraformaldehyde, water, and a catalyst or pH adjustment material is heated is defined as the "initial jacket temperature" and is between about 40° C. and about 70° C., the preferred temperature range being 60±5°C. By "initial jacket temperature" as the term is used herein, is meant the initial temperature of water circulating in a water jacket on the outside of the reaction container.

The "initial jacket temperature" of between about 40° C. and about 70° C. is an important aspect of the present invention. It has been determined that a water jacket temperature on the order of about 40° C. is necessary to initiate the reaction between melamine and paraformaldehyde. Below about 40° C. the reaction may proceed but is slow and results in the production of an inferior product. Above 70° C. danger of polymerization of the desired monomeric product is encountered and, in addition, an inferior yield and product is produced.

The "initial jacket temperature" is preferably maintained until the solid product begins to form, at which time it is preferably lowered to 20±5° C.

While it is realized that higher "initial jacket temperature" than 70° C. may be employed as for example temperatures of the order of 80° C. or 90° C. and even higher, and thereafter the temperature reduced, once the reaction has started, such procedure results in limitedly useful inferior products.

The jacket temperature is frequently a few degrees higher and even as much as 10° C. higher than the temperature of the reaction mixture. Thus, for example, where the jacket temperature is 40° C., the mixture may be 30° C., and when the jacket temperature is 70° C. the reaction mixture may be as low as 60° C.

Continuous mixing of the reactants is essential to the present invention for substantially complete condensation. Because of the low water concentration of between abou 8 and 20%, continuous mixing is essential to afford the molecules of reactants the opportunity to condense. Thus, with continuous mixing, substantially complete condensation is achieved.

As noted above, the amount of water present in the system is between about 8 and 20% by weight based on the total weight of the reaction mixture. Amounts of water below 8% are insufficient even with continuous mixing to permit substantially complete condensation. While for some purposes, a suitable product may be obtained at water concentrations as low as 5%, the reaction mass contains unreacted melamine, paraformaldehyde and low methylol melamine compounds. It has been determined that above a water concentration of 20%, the resultant methylol melamine product must necessarily be dehydrated before alkylation. This is true in that the alkylation reaction is an equilibrium reaction and the presence of amounts of water in excess of 20% tend to drive the reaction to the left or to the formation of the alcohol. This prevents the full alkylation of the methylol melamine where this is desired.

As noted above, the amount of water present in the system is based on the total weight of the reaction mixture, which term is intended to include melamine, paraformaldehyde, water and alkali acting materials. Generally speaking, the alkali acting material is caustic or other alkali which catalyzes the reaction between the melamine and the paraformaldehyde. When this alkali is added as an aqueous solution, the solution is considered to be composed entirely of water, the amount of alkali present therein weightwise being insignificant. Commercially available paraformaldehyde is 95% paraformaldehyde and 5% water with traces of methanol therein. For purposes of the present invention, this 5% water with traces of methanol is considered as being composed entirely of water in that the traces of methanol are considered to be insignificant.

Below a mol ratio of 1:6.5 melamine to paraformaldehyde full methylolation of the melamine is endangered, while above a mol ratio of 1–20 the excess of paraformaldehyde does not improve the degree of methylolation, and increases handling difficulties. A preferred mol ratio is 1 to 6.5 to 10.

The pH at which the present process is carried out is one of its more important aspects. At pH's below 8 a product of inferior quality results, and at pH's in excess of 13 undesirable polymerization of the product occurs. A preferred pH range of 9–11 has been found to be most successful and to produce optimum results.

As a means for determining the pH during the reaction, a 50% solids diluted sample may be prepared and pH determination made thereon. As for example, 10 parts of solid may be withdrawn from the container, diluted with sufficient water to make up 10 parts of water, and thereafter a pH determination made. It is preferred that the solid product be finely ground before dilution with water in order to provide an accurate pH determination.

During the reaction, the reaction mixture passes from an amorphous stage to a hard solid state. When the water concentration is 17% and above, the reaction mixture proceeds from an amorphous state to a clear solution and then to a hard solid state. This is believed to be the result of the somewhat higher percentage of water in the reaction mixture.

At these low water concentrations, when the solid methylol melamine forms it cakes despite continuous mixing and becomes very difficult to remove from the reaction container. To overcome this difficulty, a hydrocarbon, such as benzene, toluene, xylene or the like, which is not a solvent for the methylol melamine, may be incorporated into the reaction mixture either initially or after the formation of the reaction product. The presence of such a hydrocarbon enables the hard solid product, once it has been ground to a granular state by mixing means to be maintained in this state and to be more easily handled as by pumping or the like from the reaction container.

Preferably the reaction container is a piece of apparatus such as a Readco mixer, Pug-mill or the like. These mixers may be classified as heavy duty mixing apparatus and insure complete reaction by rendering the paraformaldehyde, melamine, water and catalyst homogeneous.

It has been determined, according to the present invention, that when the methylol melamine contains water in amounts less than 20% it may be substantially fully alkylated with saturated aliphatic alcohols having from 1–4 carbon atoms without subsequent dehydration. Since alkylation is an equilibrium reaction as noted above, if the amount of water is greater than 20%, this water plus the water split off during alkylation will tend to drive the reaction to the left, or to the formation of alcohol, preventing full alkylation. Thus according to one aspect of the present invention, alkylation without preliminary dehydration is possible.

While the methylolated melamine may be substantially fully alkylated when having up to 20% water therein, it appears that the less water there is present, the easier it is to alkylate. In this connection, however, if some subsequent drying is desired care must be taken not to drive off any of the combined formaldehyde, as this would prevent full alkylation of the methylol melamine where such a product is preferred. In addition, complete drying of the intermediate removes excesses of formaldehyde that tend to maintain the melamine fully methylolated. Thus in many instances it is not wholly undesirable that the intermediate methylolated melamine contain some water as for example, amounts of between 5% and 15%.

In fully alkylating methylol melamine, 1 mol methylol melamine and between 20 and 50 mols, and preferably between 25 and 30 mols, of a saturated aliphatic alcohol containing from 1–4 carbon atoms are reacted at a temperature of between 15° C. and 60° C. and at a pH of less than 3, until complete solution of the reactants is obtained. At this point the pH is adjusted to 8–10 with alkali such as caustic, potassium hydroxide, sodium bicarbonate, and the like, and thereafter the solution is vacuum concentrated until a viscous syrup is formed which is substantially free of unreacted alcohol and water, the absence of alcohol and water being indicated by a rapid rise in temperature of the syrup.

Below 15° C. the alkylation reaction is prohibitively slow, while above 60° C. undesirable polymer forms. Preferably, alkylation is carried on at a temperature of between 15° C. and 40° C.

The pH of the reaction medium is adjusted to below 3 and preferably to between 1–1.5 for optimum results, it having been determined that alkylation proceeds more rapidly and to a higher degree in the presence of an excess of a hydrogen ion. This may be done with sulfuric, hydrochloric, or other acid-acting materials. Subsequent adjustment of the pH to 8–10 with alkali stabilizes the alkylated methylol melamine in its preferred monomeric form.

Generally, after the alkylated methylol melamine solution has been rendered alkaline it is vacuum concentrated at a temperature of between 10 and 70° C. at between 5 and 250 mm. pressure. Preferably, the pressure and temperature are so regulated that during the removal of alcohol and water the temperature is maintained below 50° C. Temperatures of between 25 and 30° C. at 20 mm. pressure have been found to produce optimum results. When the temperature begins to rise rapidly, it may be assumed that most of alcohol and water have been removed. When most of the water has been removed the danger of decomposition and polymerization is greatly diminished and thus the temperature may be permitted to rise to 80–90° C. to insure removal of last traces of water and solvent.

Obviously, the methylol melamine prepared according to the present invention may be less than fully alkylated by employing lower mol ratios of methylol melamine to alcohol, while adhering to substantially the same conditions of temperature, pH and the like set forth above. Thus, mono, di, tri, and the like, alkylated methylol melamine may be readily produced.

The following examples are given primarily by way of illustration that the present invention may be more fully understood. No details therein should be construed as limitations on the present invention except as they appear in the appended claims. All parts and percentages are by weight unless otherwise designated.

EXAMPLE 1

Into a suitable container, preferably having a water jacket and mixing means thereon, 126 parts (1 mol) of melamine, 222 parts (7 mols) of 95% paraformaldehyde (5% water and methanol), 20 parts of 2 N sodium hydroxide (sufficient to adjust the pH to 10.0 and maintain the pH above 8) and 500 parts of xylene are charged. The temperature of the water jacket is then adjusted to 55° C. This mixture, which is dry to the hand before the introduction of xylene (containing only the water in the paraformaldehyde and caustic solution) goes through an amorphous stage to a hard solid, in approximately 20 minutes, which after 5 minutes solidifies within 30 seconds.

The temperature of the water jacket is then lowered to 20° C. and the product is ground by the mixing means for an additional 20 minutes to yield a granular suspension of methylol melamine in xylene. If desired, this suspension can be alkylated directly since the water concentration is about 8% based on the weight of the non-hydrocarbon components of the reaction mixture or the solids may be separated by centrifuging and dried.

The yield obtained was better than 90% based on the weight of the melamine.

EXAMPLE 2

Into a suitable container, preferably having a water jacket and mixing means thereon, 126 parts (1 mol) of melamine, 222 parts (7 mols) of 95% paraformaldehyde (5% water and methanol), 37 parts of water (sufficient to adjust the over-all water content of the reaction mixture to 17%), 20 parts of 2 N sodium hydroxide (sufficient to adjust the pH of the reaction mixture to 11 and maintain the pH above 8) and 500 parts of xylene are charged. The temperature of the water jacket is then adjusted to 65° C. This mixture which is dry to the hand before the introduction of the xylene goes through an amorphous stage to a clear solution in approximately 10 minutes, which after 5 minutes solidifies within 30 seconds.

The temperature of the water jacket is then lowered to 20° C. and grinding of the product is continued for an additional 20 minutes to yield a granular suspension of methylol melamine in xylene. The product may be alkylated directly, or separated from the xylene by centrifuging and thereafter dried.

The yield obtained was better than 90% based on the weight of the melamine.

EXAMPLE 3

To the xylene slurry, produced in Example 2, 640 parts (20 mols) of methanol and 10 parts of concentrated sulfuric acid, an amount sufficient to reduce the pH of the mixture to between 1 and 1.5 are added. The temperature of the reaction mixture is maintained between 20 and 30° C. until solution is obtained which is in about 10 minutes, after which sodium bicarbonate is added to adjust the pH to between 8 and 10.

Thereafter, the insoluble salts formed are filtered off and the resulting syrup is vacuum concentrated to strip off excess methanol and water. This is done at a temperature between 30 and 50° C. and at a pressure of 20 mm., the pressure being adjusted to maintain the temperature below 50° C.

The residue, a xylene solution, contained a 90% yield of methylated methylol melamine based on the weight of the melamine.

If the methylated methylol melamine of this example is separated from the xylene by conventional methods, it will crystallize at room temperature indicating a product of good purity.

EXAMPLE 4

To a xylene slurry produced according to Example 2, 1850 parts (25 mols) of n-butanol and 10 parts of concentrated sulfuric acid, an amount sufficient to reduce the pH of the mixture to 1.2 is added. Thereafter the procedure was the same as that set forth in Example 3, although a longer period of time was required for the reactants to go into solution.

The residue was a xylene solution containing a 90% yield of butylated methylol melamine based on the weight of the melamine.

The methylol melamine produced according to the above examples can be recrystallized from water and decomposes at 168° C.

The alkylated methylol melamines of the present invention are not fully or infinitely water soluble at room temperature and it has been noted that the degree of solubility of the product decreases as the temperature increases. As an example of this a saturated solution of water and methylated methylol melamine representative of the resins made according to the present invention at 25° C., contained about 33% of the methylated product and about 67% of water. A saturated solution of the mixture of these components at 60° C. contained about 16% of the methylated product and about 84% water.

The alkylated methylol melamines of this invention are compatible with a wide variety of alkyd resins, and improve their surface coating properties, both when used alone therewith and when used in combination with other commercially available amino resins.

The amino resin of the present invention may be successfully used with the oil-free, or oil-containing alkyds, the latter group being classified as short, medium, and long oil resins.

The oil-containing alkyds, generally speaking, are made from three reactants: (1) a polycarboxylic acid free from nonbenzenoid unsaturation or its anhydride, (2) polyhydric alcohol, and (3) a glyceride oil, either non-drying, semi-drying, drying or the fatty acids derived therefrom or their monoglycerides.

Said polycarboxylic acid is present in preponderant amounts, sometimes to the complete exclusion of any unsaturated polycarboxylic acids, such as those that are not free from any non-benzenoid saturation. The alpha-beta ethylenically unsaturated polycarboxylic acids may be used in relatively small amounts, generally in amounts not exceeding about 10% by weight based on the total weight of polycarboxylic acids used.

Among the polycarboxylic acids free of non-benzenoid unsaturation that may be used are phthalic, oxalic, malonic, succinic, glutaric, sebacic, adipic, pimelic, suberic, azelaic, tricarballylic, citric, tartaric, malic, and the like. Whenever available, the anhydrides may be used. Furthermore, mixtures of these acids and/or their anhydrides may be used.

Among the polyhydric alcohols which may be used are ethylene glycol, diethylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, alkane diols, propylene glycol, dipropylene glycol and the like. These polyhydric alcohols may be used alone or in admixture with each other.

Oils suitable for use in formulating oil-containing alkyds include coconut oil, cottonseed, soybean, linseed, perilla, castor, babassu, murumuru, tallow-beef, mustard seed, rape seed, peanut, sesame, sunflower, walnut, tung, oiticia, whale, menhaden, sardine and the like. These oils may be used alone or in admixture with each other.

Good surface coatings for specific purposes may be obtained where the amino resin of the present invention in a 100 part mixture with an alkyd constitutes between 1 and 80 parts thereof, although such mixtures containing between 3 and 40 parts are preferred.

Table 1 below illustrates the compatibility of the amino resin according to the present invention with various commercial alkyd resins and in varied amounts. Resin A, therein is a resin made according to the process set forth in Example 3 supra, which has been cut in a 50:50 xylene butanol mixture. Resin B is a 1:1 mixture of resin A and a commercially available amino resin, hereinafter called resin C, which is essentially pentamethylolmelamine which has been alkylated with from 2 to 3 mols of butanol and which is cut in a 45:55 xylene to butanol solvent mixture. Since resin A is cut in a 50:50 xylene butanol mixture, resin B which is a mixture of resins A and C is cut in a 47:53 xylene butanol solvent mixture. Resins A, B, and C each contain, as a catalyst, 1% p-toluene sulfonic acid based on the total amino solids.

It should be understood that while these amino resins are cut in xylene-butanol solvent mixtures, for many purposes all xylene or other hydrocarbon solvents are preferred, as where the odor of butanol is objectionable. In addition, these solvent ratios are illustrative, and may be varied over wide ranges as is well known in the art.

Resin D referred to therein is a short oil alkyd resin which is principally the reaction product of phthalic anhydride, ethylene glycol, pentaerythritol and tall oil fatty acids. Resin E is a medium oil alkyd, the reaction product of phthalic anhydride, soya bean oil, and a monoglyceride; resin F is also a medium oil alkyd, the reaction product of phthalic anhydride, soya fatty acid, and glycerin. Resin G is a medium oil phthalic anhydride, soya fatty acid, glycerin reaction product, which has been coreacted with styrene.

For purposes of determining the compatibility of the amino resin of the present invention it was mixed in graduated amounts with resins D–G and observed, coated on glass surfaces, air dried for 30 minutes, and observed, and then baked on the said surfaces for 10 minutes at 300° F. and observed.

*Table 1.—Compatibility with alkyd resins*

|  | Resin A | | | Resin B | | | Resin C | | |
| --- | --- | --- | --- | --- | --- | --- | --- | --- | --- |
|  | Mix | Air | Bake | M | A | B | M | A | B |
| Resin D+: | | | | | | | | | |
| 10% amino | C | C | C | C | C | C | C | C | C |
| 30% | C | C | C | C | C | C | C | C | BH |
| 50% | C | C | C | C | C | C | C | C | H |
| Resin E+: | | | | | | | | | |
| 10% amino | C | C | C | C | C | C | C | C | C |
| 30% | C | C | C | C | C | C | C | BH | C |
| 50% | C | C | C | C | C | C | C | BH | H |
| Resin F+: | | | | | | | | | |
| 10% amino | C | C | C | C | C | C | C | H | BH |
| 30% | C | C | C | C | C | C | C | Cl | BH |
| 50% | C | C | C | C | BH | C | C | Cl | Cl |
| Resin G+: | | | | | | | | | |
| 10% amino | C | C | C | C | C | C | C | BH | BH |
| 30% | C | C | C | C | C | C | H | BH | Cl |
| 50% | C | C | C | C | C | C | Cl | Cl | Cl |

Code: C=Clear; BH=Bluish Haze; H=Hazy; Cl=Cloudy.

A study of the table indicates that the resin produced according to the present invention (resin A) is compatible with a wide variety of alkyds, and is superior in compatibility therewith than commercially available amino resin C. In addition, it should be noted that resin B which is a 1:1 mixture of resins A and C is substantially equal to resin A in compatibility. This obviously is the result of resin A being present in the mixture.

Table 2 is an evaluation of films of white baking enamels which have been placed on steel by a 0.003 mil Bird doctor blade and baked 30 minutes at 300° F. The pigment/binder (P/B) ratio of the enamels is 100:100, the pigment being titanium dioxide. The resin ratio of the binders is 80:20 and consists of 80 parts of a short oil alkyd (hereinafter referred to as resin H) which is essentially the reaction product of phthalic anhydride, soya fatty acids and glycerin, and 20 parts of amino resin. Each of the resin binders contains, as a catalyst, 1% p-toluene sulfonic acid based on the weight of the total amino solids. In addition, the total solvent ratio of the enamel has been adjusted to 80:20 xylene/butanol.

*Table 2.—White enamel evaluation*

| Resin | H/A | H/A/C | H/C |
| --- | --- | --- | --- |
| 30′ at 300° F | 80/20 | 80:10:10 | 80:20 |
| Steel: | | | |
| Color | 90 | 89 | 85 |
| Gloss Vis | 90 | 95 | 85 |
| Gloss 60° [1] | 90 | 98 | 84 |
| Sward | 58 | 56 | 46 |
| Mar Res | 90 | 80 | 70 |
| Xylene [2] | 100 | 50 | 0 |
| Acetic Acid 50% [3] | 100 | 50 | 0 |
| NaOH 10% [4] | 100 | 98 | 10 |

[1] Gardner Portable 60° Glass Meter.
[2] Rating at 20′.
[3] Rating at 1 hour.
[4] Rating at 3 hours.

In the above chart:

A—100 is theoretically perfect for color, gloss vis., gloss 60° and mar res.
B—Swards reading is an actual number. The larger the number, the harder the film.
C—In evaluation of chemical resistance, 100 indicates that the film is substantially unchanged over time period indicated, 0 indicates its complete failure.

Table 2 demonstrates that enamel finishes, the resin binders of which consist of the amino resin of the present invention, and a commercially available alkyd, are superior. It further demonstrates that when the resin binder consists of the aminoplast material of the present invention, said commercially available amino resin and the said alkyd, the finish is superior to one in which the binder is a mixture of said commercial amino and said alkyd. This improvement is obviously the result of the presence of the amino resin of the invention in the binder.

Conventional acid catalysts may be used with the resin of the present invention and in conventional amounts. A suitable catalyst is p-toluene sulfonic acid which has been used with success in conventional amounts such as between 0.25–1.50% of the total amino resin although smaller and larger amounts have been found to be satisfactory. Other suitable catalysts include oxalic, formic, phthalic, maleic, chlorofumaric, trichloroacetic, phosphoric, hydrochloric acid and the like.

We claim:

1. A process comprising heating with continuous mixing reactants consisting of melamine and paraformaldehyde in the presence of about 8%–20% by weight of water based on the total weight of the reaction mixture, while maintaining a pH of at least 8 and not greater than 13 as determined by a reading taken on a 50% solids diluted sample at an initial jacket temperature between about 40° C. and 70° C. for a period of time sufficient to form an amorphous material and finally a hard solid, and finely dividing the resultant hard solid product into a granular material, wherein the mol ratio of melamine to paraformaldehyde is between 1:6.5 and 1:20, respectively.

2. A process comprising heating with continuous mixing reactants consisting of melamine and paraformaldehyde in the presence of about 8%–17% by weight of water based on the total weight of the reaction mixture while maintaining a pH of between 9 and 11 as determined by a reading taken on a 50% solids diluted sample at an initial jacket temperature of between 55° C. and 65° C. for a period of time sufficient to form an amorphous material and finally a hard solid, and finely dividing the resultant hard solid product into a granular material wherein the mol ratio of the melamine to paraformaldehyde is between 1:6.5 and 1:10 respectively.

3. A process according to claim 2 characterized by cooling the jacket temperature to between 15° C. and 25° C. and finely dividing the resultant hard product into a granular material in the presence of a hydrocarbon which is not a solvent for the product.

4. A process comprising heating with continuous mixing reactants consisting of melamine and paraformaldehyde in mol ratios of 1:6.5 and 1:20 respectively, in the presence of about 8 to 20% by weight of water based on the total weight of the reaction mixture while maintaining a pH of at least 8 and not greater than 13, as determined by a reading taken on a 50% solids diluted sample, at an initial jacket temperature of between about 40° C. and 70° C. for a period of time sufficient to form an amorphous material and finally a hard solid, and finely dividing the resultant hard solid product into a granular material, and thereafter reacting the material with a saturated aliphatic alcohol containing from 1 to 4 carbon atoms.

5. A process comprising heating with continuous mixing reactants consisting of melamine and paraformaldehyde in mol ratios of 1:6.5 and 1:20 respectively, in the presence of 8 to 20% by weight of water based on the total weight of the reaction mixture while maintaining a pH of at least 8 and not greater than 13 as determined by a reading taken on a 50% solids diluted sample at an initial jacket temperature of between about 40° C. and 70° C. for a period of time sufficient to form an amorphous material and finally a hard solid, and finely dividing the resultant hard solid product into a granular material, adding to the resultant finely divided solid product a saturated aliphatic alcohol containing 1 to 4 carbon atoms, maintaining the resultant mixture at a temperature of between 15° C. and 60° C. at a pH of less than 3 until complete solution of the reactants is obtained, adjusting the pH of the mixture to about 8 to 10, and thereafter vacuum concentrating until a viscous syrup is formed which is substantially free of unreacted alcohol and water.

6. A process comprising heating with continuous mixing reactants consisting of melamine and paraformaldehyde in mol ratios of 1:6.5 and 1:20 respectively, in the presence of 8 to 20% by weight of water based on the total weight of the reaction mixture while maintaining a pH of at least 8 and not greater than 13 as determined by a reading taken on a 50% solids diluted sample at an initial jacket temperature of between about 40° C. and 70° C. for a period of time sufficient to form an amorphous material and finally a hard solid, and finely dividing the resultant hard solid product into a granular material, adding at least 20 mols of a saturated alcohol containing from 1 to 4 carbon atoms, maintaining the resultant mixture at a temperature of between 15° C. and 60° C. and at a pH of less than 3 until complete solution of the reactants is obtained, adjusting the pH of the mixture to about 8-10, and thereafter vacuum concentrating until a viscous syrup is formed which is substantially free of unreacted alcohol and water.

7. A process comprising heating with continuous mixing reactants consisting of melamine and paraformaldehyde in mol ratios of 1:6.5 and 1:20 respectively, in the presence of 8 to 20% by weight of water based on the total weight of the reaction mixture while maintaining a pH of at least 8 and not greater than 13 as determined by a reading taken on a 50% solids diluted sample at an initial jacket temperature of between about 40° C. and 70° C. for a period of time sufficient to form an amorphous material and finally a hard solid, and finely dividing the resultant hard solid product into a granular material, adding from 25 to 30 mols of methanol to the finely divided hard solid, maintaining the resultant mixture at a temperature of between 15° C. and 40° C. at a pH of between 1 and 1.5 until complete solution of the reactants is obtained, adjusting the pH of the mixture to from 8 to 10, and thereafter vacuum concentratting until a viscous syrup is formed which is substantially free of unreacted methanol and water.

8. The process according to claim 7 characterized by the alcohol being ethanol.

9. The process according to claim 7 characterized by the alcohol being propanol.

10. The process according to claim 7 characterized by the alcohol being butanol.

References Cited in the file of this patent

UNITED STATES PATENTS

| | | |
|---|---|---|
| 2,331,446 | Widmer et al. | Oct. 12, 1943 |
| 2,486,665 | Marling | Nov. 1, 1949 |
| 2,645,625 | Bonzagni | July 14, 1953 |
| 2,715,619 | Suen | Aug. 16, 1955 |
| 2,781,332 | Swann et al. | Feb. 12, 1957 |
| 2,804,441 | Nickerson | Aug. 27, 1957 |